(12) United States Patent
Lee

(10) Patent No.: US 10,305,073 B2
(45) Date of Patent: May 28, 2019

(54) BATTERY PACK INCLUDING BATTERY CELLS WITH TERRACES SUPPORTED BY SUPPORT RIBS

(71) Applicant: SAMSUNG SDI CO., LTD., Yongin-si, Gyeonggi-do (KR)

(72) Inventor: Jieun Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 55 days.

(21) Appl. No.: 15/002,737

(22) Filed: Jan. 21, 2016

(65) Prior Publication Data

US 2016/0248057 A1    Aug. 25, 2016

(30) Foreign Application Priority Data

Feb. 25, 2015 (KR) .................. 10-2015-0026746

(51) Int. Cl.
| | |
|---|---|
| *H01M 2/10* | (2006.01) |
| *H01M 2/06* | (2006.01) |
| *H01M 2/02* | (2006.01) |
| *H01M 2/26* | (2006.01) |
| *H01M 2/20* | (2006.01) |

(52) U.S. Cl.
CPC .......... *H01M 2/1016* (2013.01); *H01M 2/06* (2013.01); *H01M 2/202* (2013.01)

(58) Field of Classification Search
CPC .... H01M 2/1077; H01M 2/30; H01M 10/482; H01M 2/021; H01M 2/1016
See application file for complete search history.

(56) References Cited

U.S. PATENT DOCUMENTS

| | | |
|---|---|---|
| 8,197,960 B2 | 6/2012 | Kosugi et al. |
| 2003/0064285 A1 | 4/2003 | Kawamura et al. |
| 2007/0048603 A1 | 3/2007 | Cherng et al. |
| 2007/0141457 A1 | 6/2007 | Amagai |
| 2008/0124617 A1 | 5/2008 | Bjork |
| 2009/0117412 A1 | 5/2009 | Koh et al. |
| 2009/0258285 A1 | 10/2009 | Kim |
| 2010/0052692 A1 | 3/2010 | Yano et al. |
| 2010/0124693 A1 | 5/2010 | Kosugi et al. |
| 2010/0209743 A1 | 8/2010 | Koh et al. |
| 2010/0310909 A1* | 12/2010 | Yun ........................ H01M 2/206 429/90 |
| 2010/0323235 A1 | 12/2010 | Takami et al. |

(Continued)

FOREIGN PATENT DOCUMENTS

| | | |
|---|---|---|
| CN | 102 055 002 A | 5/2011 |
| JP | 2007-265945 | 10/2007 |

(Continued)

OTHER PUBLICATIONS

USPTO Office Action dated May 19, 2017, in U.S. Appl. No. 15/002,424.

(Continued)

*Primary Examiner* — Imran Akram
(74) *Attorney, Agent, or Firm* — Lee & Morse, P.C.

(57) ABSTRACT

A battery pack includes a battery cell including an electrode tab, a cell holder through which the electrode tab is inserted, and a support rib protruding from the cell holder toward the battery cell, the support rib supporting a terrace of the battery cell from which the electrode tab extends.

13 Claims, 7 Drawing Sheets

(56) References Cited

U.S. PATENT DOCUMENTS

| | | |
|---|---|---|
| 2011/0003195 A1 | 1/2011 | Kim |
| 2011/0039131 A1 | 2/2011 | Moon |
| 2011/0200866 A1 | 8/2011 | Yun et al. |
| 2012/0058391 A1 | 3/2012 | Jiang et al. |
| 2012/0115015 A1 | 5/2012 | Park et al. |
| 2012/0282516 A1 | 11/2012 | Kim |
| 2012/0295150 A1 | 11/2012 | Gao et al. |
| 2012/0328908 A1 | 12/2012 | Han et al. |
| 2013/0034763 A1 | 2/2013 | Byun |
| 2014/0017541 A1* | 1/2014 | Suzuki ............... B62M 6/90 429/99 |
| 2015/0037662 A1 | 2/2015 | Pinon et al. |
| 2015/0207127 A1* | 7/2015 | Davis ............... H01M 2/1077 429/90 |
| 2017/0084899 A1* | 3/2017 | Deng ............... H01M 2/26 |

FOREIGN PATENT DOCUMENTS

| | | |
|---|---|---|
| JP | 2010-009225 A | 1/2010 |
| JP | 2010-123299 A | 6/2010 |
| JP | 2011-233319 | 11/2011 |
| JP | 2013-092840 A | 5/2013 |
| JP | 2014-053104 A | 3/2014 |
| KR | 10-2007-0081545 A | 8/2007 |
| KR | 10-2009-0030202 A | 3/2009 |
| KR | 10-2010-0026986 A | 3/2010 |
| KR | 10-2012-0048259 A | 5/2012 |
| KR | 10-2012-0123946 A | 11/2012 |
| KR | 10-2013-0023059 A | 3/2013 |
| WO | WO 2009/057984 A | 5/2009 |
| WO | WO 2014/011801 A1 | 1/2014 |
| WO | WO 2014/024433 A1 | 2/2014 |

OTHER PUBLICATIONS

Extended European Search Report dated Jul. 16, 2016 for EP Application No. 16157333.2 which is a family member for co-pending U.S. Appl. No. 15/002,712.

European Office Action dated Apr. 7, 2017 for EP Application No. 16157333.2 which is a family member for co-pending U.S. Appl. No. 15/002,712.

Extended European Search Report dated Jul. 7, 2016 for EP Application No. 16157335 which is a family member for co-pending U.S. Appl. No. 15/002,424.

USPTO Office Action dated Dec. 7, 2017, in U.S. Appl. No. 15/002,424.

USPTO Office Action dated Jan. 17, 2018, in U.S. Appl. No. 15/002,712.

USPTO Notice of Allowance dated May 16, 2018, in U.S. Appl. No. 15/002,424.

USPTO Office Action dated Apr. 27, 2018, in U.S. Appl. No. 15/002,422.

USPTO Final Rejection dated Sep. 5, 2018, in U.S. Appl. No. 15/002,422.

USPTO Rejection dated Feb. 28, 2019, in U.S. Appl. No. 15/002,422.

* cited by examiner

BATTERY PACK INCLUDING BATTERY CELLS WITH TERRACES SUPPORTED BY SUPPORT RIBS

CROSS-REFERENCE TO RELATED APPLICATION

Korean Patent Application No. 10-2015-0026746, filed on Feb. 25, 2015, in the Korean Intellectual Property Office, and entitled: "Battery Pack," is incorporated by reference herein in its entirety.

BACKGROUND

1. Field

Embodiments relate to a battery pack.

2. Description of the Related Art

Unlike primary batteries, secondary batteries are rechargeable. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected are used according to the types of external devices using the secondary batteries.

SUMMARY

Embodiments are directed to a battery pack including a battery cell including an electrode tab, a cell holder through which the electrode tab is inserted, and a support rib protruding from the cell holder toward the battery cell, the support rib supporting a terrace of the battery cell from which the electrode tab extends.

The support rib may be in contact with the terrace of the battery cell.

The support rib may extend in a direction parallel to the terrace of the battery cell.

The battery pack may include a plurality of battery cells. The cell holder may extend across the battery cells.

The cell holder may extend across terraces of the battery cells in a state in which the support rib is between the cell holder and the terraces.

The support rib may include a plurality of support ribs in an arrangement direction of the battery cells.

At least one of the plurality of support ribs may support terraces of neighboring battery cells.

Inner support ribs of the plurality of support ribs in the arrangement direction of the battery cells may have a relatively wide width such that each of the inner support ribs supports terraces of neighboring battery cells. End support ribs of the plurality of ribs at both ends in the arrangement direction of the battery cells may have a relative narrow width such that each of the end support ribs supports a terrace of one battery cell.

The support rib may be formed in one piece with the cell holder.

The cell holder may include expansion connection parts that are connectable with another cell holder such that a number of battery cells included in the battery pack is increasable.

The expansion connection parts may include a pair of expansion connection parts at lateral positions of a long side of the cell holder.

The expansion connection parts may protrude from the cell holder.

The expansion connection parts may include at least one selected from protrusions and holes.

The battery pack may further include a connection tab above the cell holder, the connection tab being connectable to the electrode tab.

The battery cell may be a pouch type battery cell with a flexible case.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Battery packs will now be described in detail with reference to the accompanying drawings, in which exemplary embodiments are shown.

Figure 1:
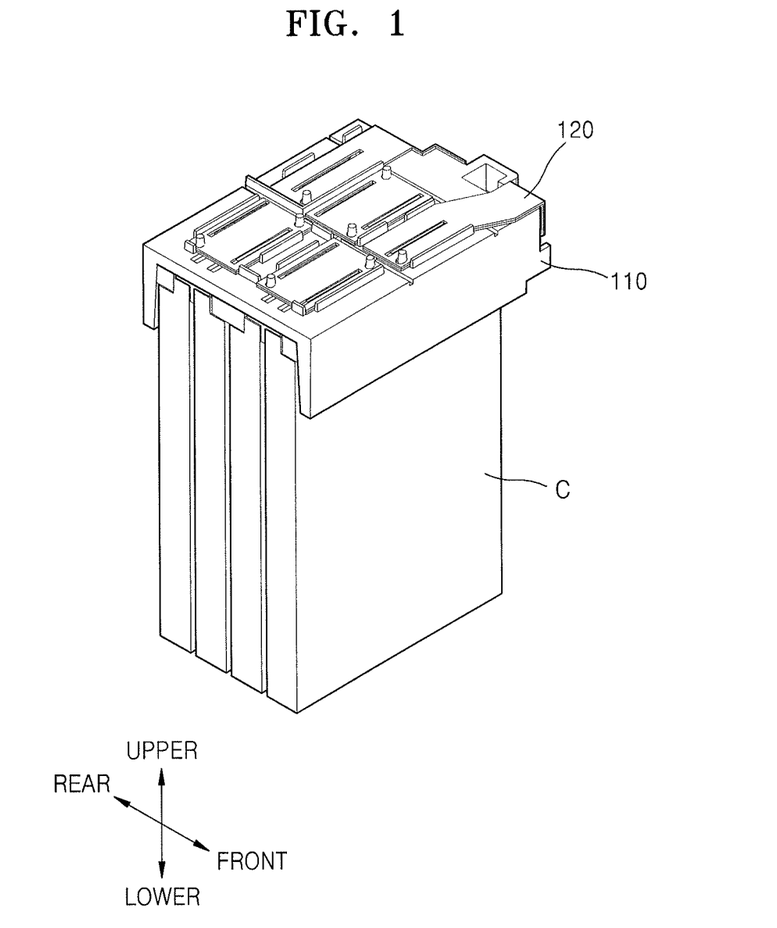
FIG. 1 illustrates a view depicting a battery pack according to an exemplary embodiment.
Figure 2:
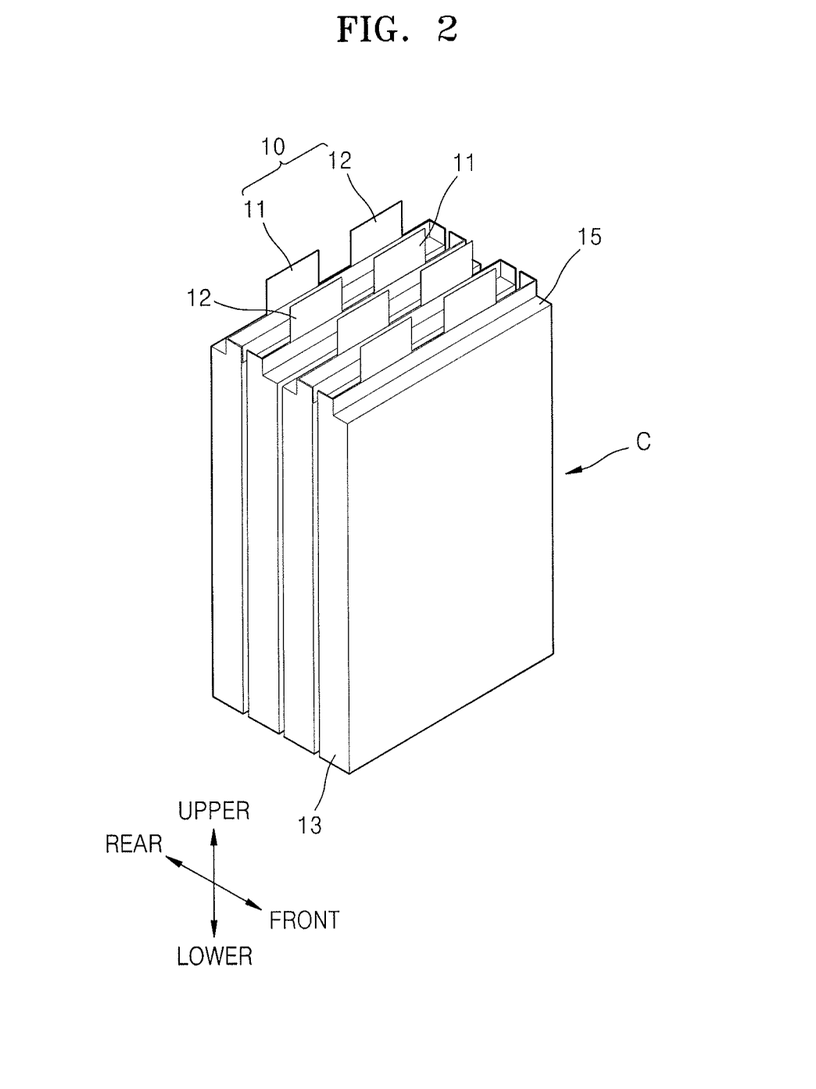
FIG. 2 illustrates a perspective view of the battery cells depicted in FIG. 1.
Figure 3:
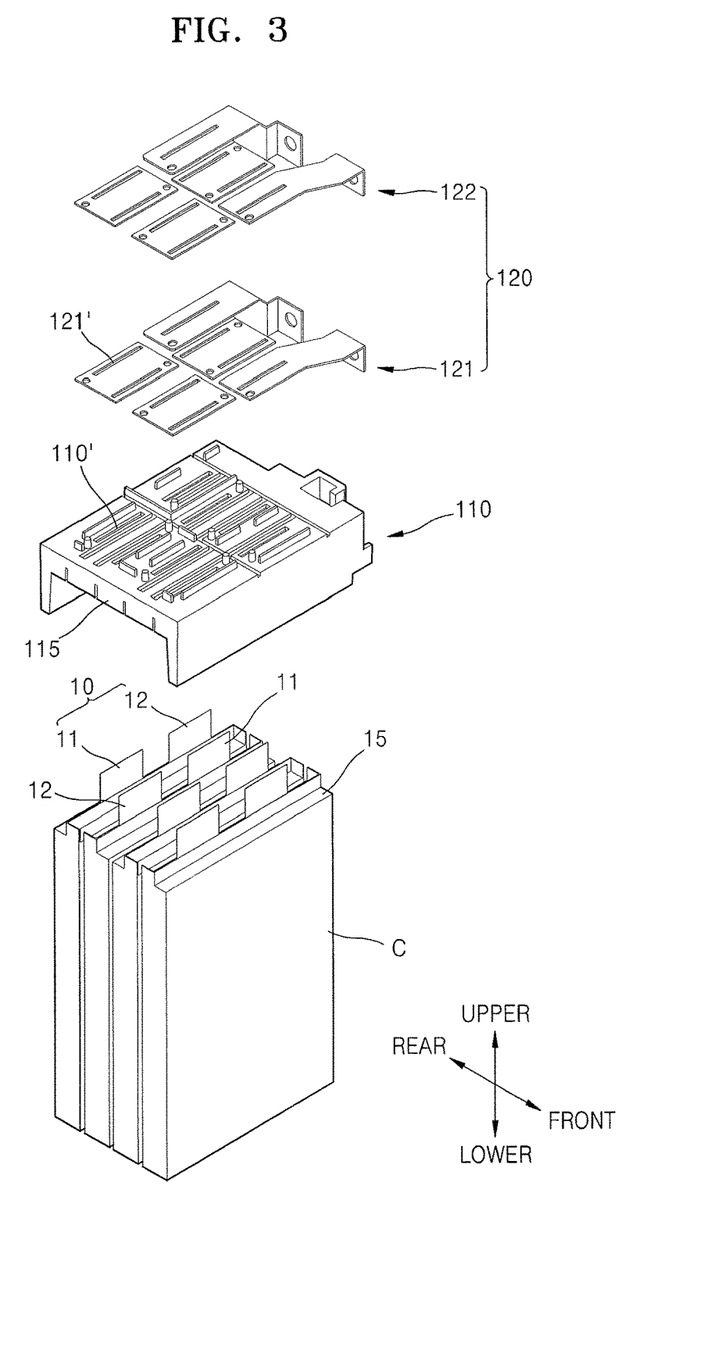
FIG. 3 illustrates an exploded perspective view of the battery pack depicted in FIG. 1.

FIG. 1 illustrates a view depicting a battery pack according to an exemplary embodiment. FIG. 2 illustrates a perspective view of the battery cells depicted in FIG. 1. FIG. 3 illustrates an exploded perspective view depicting the battery pack depicted in FIG. 1.

Referring to FIG. 1, the battery pack includes at least two battery cells C and a cell holder 110 to which the battery cells C are coupled. The battery cells C may include lithium-ion battery cells. Each of the battery cells C may include an electrode assembly having a stacked structure formed by first and second electrode plates having different polarities and a separator disposed between the first and second electrode plates. A plurality of first and second electrode plates and a plurality of separators may be stacked in the electrode assembly to increase the output power and capacity of the battery cell C.

In addition, referring to FIG. 2, the each of the battery cells C may include a case 13 to seal the electrode assembly. The battery cells C may each be pouch type battery cell including a relatively flexible case 13 instead of a metal can. The battery cells C may include electrode tabs 10 electrically connected to the electrode assemblies and extending outward from the cases 13. Each of the battery cells C may include first and second electrode tabs 11 and 12 respectively making electrical connection with the first and second electrode plates and thus having different polarities. In this specification, the term "electrode tab(s) 10" refers to one or both of the first and second electrode tabs 11 and 12. The battery cells C may include terraces 15 from which the electrode tabs 10 outwardly extend.

Referring to FIG. 3, the battery cells C may be coupled to the cell holder 110. For example, the battery cells C may be coupled to the cell holder 110 in such a manner that the electrode tabs 10 of the battery cells C are exposed on an upper surface of the cell holder 110. The cell holder 110 may support and hold the battery cells C, and the battery cells C may be maintained at proper positions when inserted into the cell holder 110. The cell holder 110 may structurally combine the battery cells C into a single module.

The cell holder 110 may include a plurality of tab holes 110' corresponding to the battery cells C. The electrode tabs 10 extending from the battery cells C may be inserted through the tab holes 110' and exposed to the outside. The tab holes 110' may be paired such that the first and second electrode tabs 11 and 12 extending from each of the battery cells C may be inserted through a pair of the tab holes 110'. For example, the first and second electrode tabs 11 and 12 extending from one of the battery cells C may be inserted through a pair of the tab holes 110', and then the first and second electrode tabs 11 and 12 may be bent forward or backward in opposite directions to make electrical connection with neighboring battery cells C disposed in front and rear directions.

Battery cells C neighboring each other in a front-to-rear direction may be electrically connected to each other through connection tabs 120 superposed on the first and second electrode tabs 11 and 12 of the battery cells. For example, battery cells C arranged in the front-to-rear direction may be structurally modularized by the cell holder 110 and then may be electrically modularized by the connection tabs 120.

The connection tabs 120 may be superposed on the electrode tabs 10 that extend from the cell holder 110 through the tab holes 110'. The connection tabs 120 may be coupled to the electrode tabs 10 by, for example, welding.

For example, the connection tabs 120 may include pairs of first and second connection tabs 121 and 122. Each pair of first and second connection tabs 121 and 122 may be disposed on lower and upper sides of the electrode tabs 10 to place the electrode tabs 10 therebetween. As described above, the electrode tabs 10 may be sandwiched between the first and second connection tabs 121 and 122 of the connection tabs 120 disposed on the lower and upper sides of the electrode tabs 10. Accordingly, electrical connection between the electrode tabs 10 and the connection tabs 120 may be made more smoothly. For example, the electric contact area between the connection tabs 120 and the electrode tabs 10 may be increased. Moreover, the coupling strength between the connection tabs 120 and the electrode tabs 10 may be improved.

For example, the electrode tabs 10 extending from the battery cells C may be inserted through the tab holes 110' of the cell holder 110 and tab holes 121' of the first connection tabs 121 and exposed on upper surfaces of the first connection tabs 121. The second connection tabs 122 may be superposed on the upper surfaces of the first connection tabs 121 on which the electrode tabs 10 are exposed.

Figure 4:
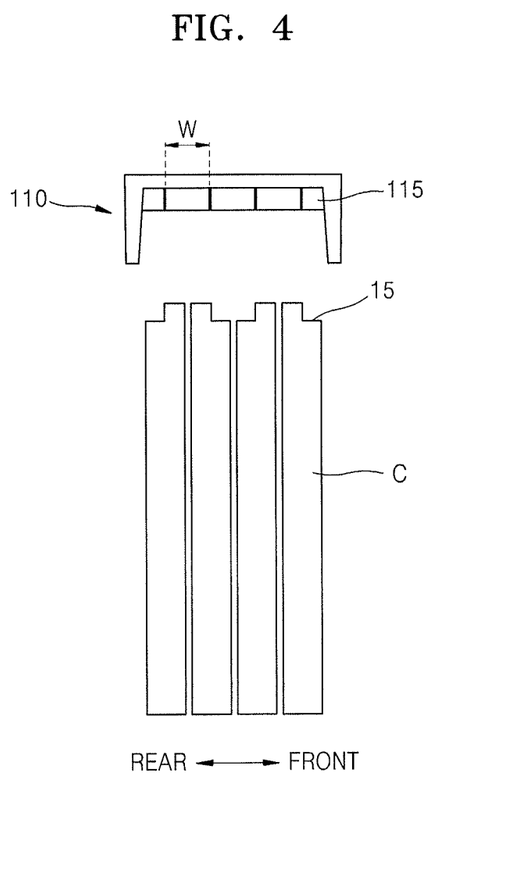
FIGS. 4 and 5 illustrate a plan view and a perspective view depicting a lateral side and a lower side of a cell holder for explaining support ribs of the cell holder.
Figure 5:
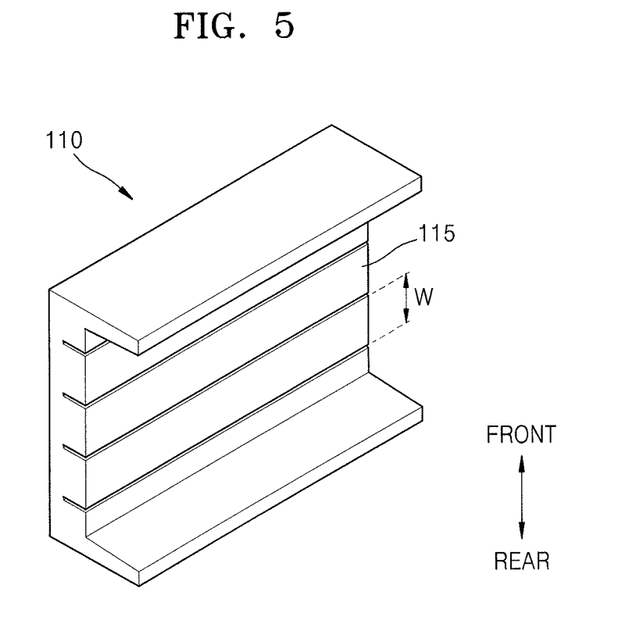

FIGS. 4 and 5 illustrate a plan view and a perspective view depicting a lateral side and a lower side of the cell holder 110 for explaining support ribs 115 of the cell holder 110.

Referring to FIGS. 3, 4, and 5, the cell holder 110 may include the support ribs 115 protruding toward the battery cells C. The support ribs 115 may protrude downwardly toward the battery cells C. The support ribs 115 may support portions of the battery cells C, for example, the terraces 15 of the battery cells C. For example, when the battery cells C are coupled to the cell holder 110 through a lower side of the cell holder 110, the support ribs 115 may help to prevent the terraces 15 of the battery cells C from colliding with a lower surface of the cell holder 110 and may maintain a proper distance between the cell holder 110 and the terraces 15 of the battery cells C, thereby helping to prevent the electrode tabs 10 from being damaged during a welding process. The support ribs 115 may protrude from the cell holder 110 toward the terraces 15 of the battery cells C. Accordingly, the coupling height of the battery cells C may be regulated to maintain a proper distance between the cell holder 110 and the battery cells C. The cell holder 110 may be less likely to be damaged by collision, and the electrode tabs 10 may be less likely to be damaged during welding. For example, when the battery cells C are inserted into the cell holder 110 in a direction from the lower side to the upper side of the cell holder 110, if the battery cells C are pushed until being stopped by the support ribs 115, the coupling height of the battery cells C may be determined. The terraces 15 of the battery cells C may be brought into contact with the support ribs 115 of the cell holder 110 and stably supported by the support ribs 115.

The support ribs 115 support the terraces 15 of the battery cells C. Accordingly, the support ribs 115 may help to prevent battery cells C from colliding with the cell holder 110 while making a movement centered on the electrode tabs 10, and neighboring battery cells C or electrode tabs 10 may be prevented from colliding with each other. Damage or deformation of the battery cells C may be reduced or prevented. The support ribs 115 may be brought into direct contact with the terraces 15 of the battery cells C. In addition, even when the support ribs 115 are not in direct contact with the terraces 15 of the battery cells C, the support ribs 115 may be located close to the terraces 15 of the battery cells C so as to prevent the battery cells C from wobbling.

Owing to the support ribs 115, gaps between the battery cells C may be uniformly maintained. For example, the battery cells C could wobble or move in a state in which the electrode tabs 10 of the battery cells C are fixed to the cell holder 110. In this case, the support ribs 115 may support the terraces 15 of the battery cells C and may suppress wobbling of the battery cells C. Accordingly, gaps formed between the battery cells C may be uniformly maintained. In the exemplary embodiment, as described above, the battery cells C may be pouch type battery cells including flexible cases 13 that are weaker than metal cans. In this case, the support ribs 115 may support the terraces 15 of the battery cells C, and the battery cells C may be reliably protected.

As shown in FIG. 5, the support ribs 115 may have a strip shape extending in the length directions of the battery cells C and the terraces 15. The number of the support ribs 115 may correspond to the number of the battery cells C.

As shown in FIG. 4, each of the support ribs 115 may support the terraces 15 of two neighboring battery cells C. For example, each of the support ribs 115 may make contact with both of the terraces 15 of two neighboring battery cells C. The terraces 15 of a neighboring pair of the battery cells C arranged in the front-to-rear direction may be connected to each other and supported by one support rib 115. For example, one support rib 115 may support a pair of neighboring terraces 15 to maintain a proper distance from the cell holder 110. However, each of the frontmost and rearmost support ribs 115s in an arrangement direction of the battery cells C may support the terrace 15 of one battery cell C.

The support ribs 115 may be arranged in the arrangement direction of the battery cells C and may be spaced apart from each other. As shown in FIG. 4, each inner support ribs 115 in the arrangement direction of the battery cells C may have a relatively wide width W so as to support the terraces 15 of a pair of neighboring battery cells C. Each of the forefront and rearmost support ribs 115 in the arrangement direction of the battery cells C may have a relatively narrow width so as to support the terrace 15 of only one battery cell C.

In the exemplary embodiment, the cell holder 110 may extend across the terraces 15 of the battery cells C in a state in which the support ribs 115 are disposed between the cell holder 110 and the terraces 15 of the battery cells C. The cell holder 110 may be maintained at a distance from the battery cells C owing to the support ribs 115. Thus, physical damage to the battery cells C may be prevented.

In the exemplary embodiment, the support ribs 115 supporting portions of the battery cells C may be formed in one piece with the cell holder 110. In a comparative example, pieces of foam tape may be disposed between the cell holder 110 and the terraces 15 of the battery cells C. However, in this case, due to the addition of foam tape, the numbers of parts and processes for manufacturing the battery pack may be increased. In addition, when pieces of foam tapes are attached to the terraces 15 of the battery cells C, the attachment state of the foam tape may not be uniform due to process deviations.

In the exemplary embodiment, however, the support ribs 115 supporting portions of the battery cells C are formed in one piece with the cell holder 110. Thus, additional parts or processes may be omitted. In addition, the support ribs 115 may be uniformly formed. Accordingly, the battery pack may be used or operated more reliably.

In the exemplary embodiment, the output power of the battery pack may be increased by increasing the number of battery cells C included in the battery pack. For example, the battery pack may be expanded by repeatedly arranging unit packs, each unit pack being a group of battery cells C.

Figure 6:
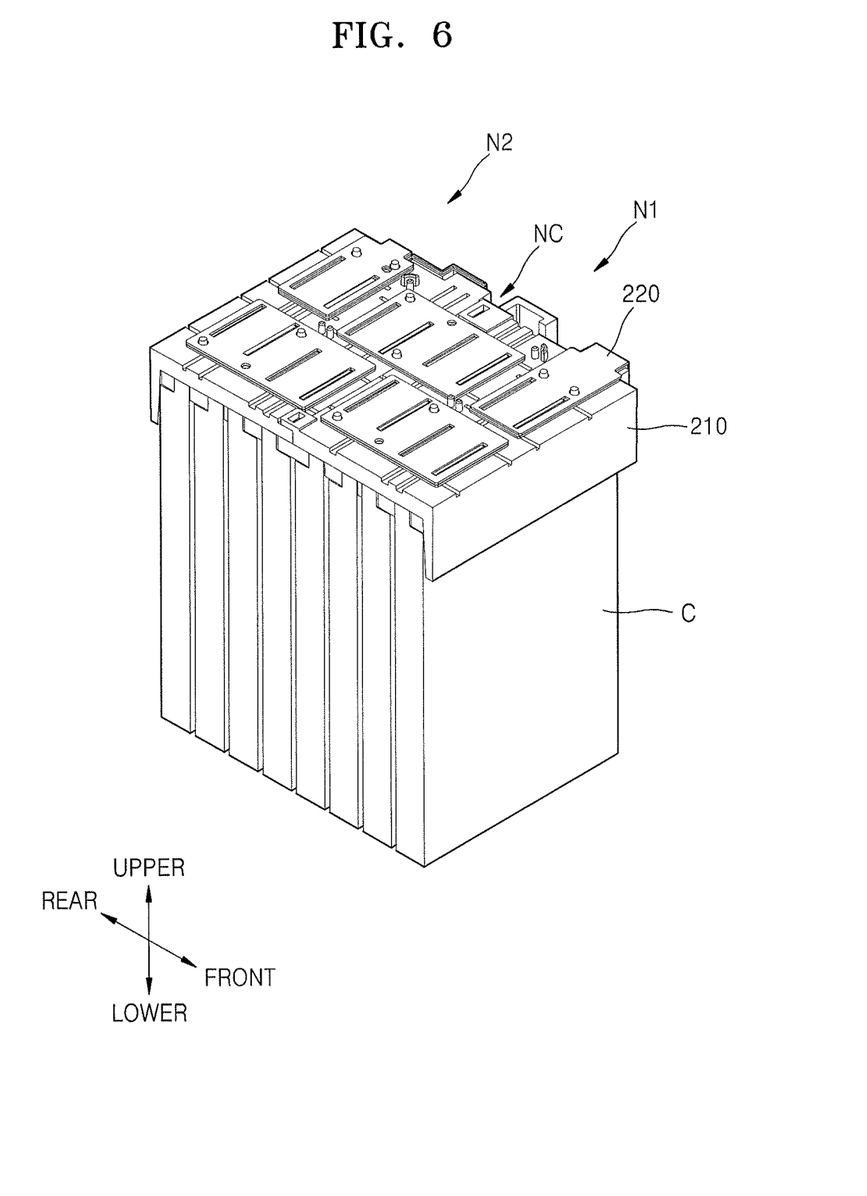
FIG. 6 illustrates a view depicting a battery pack according to another exemplary embodiment.
Figure 7:
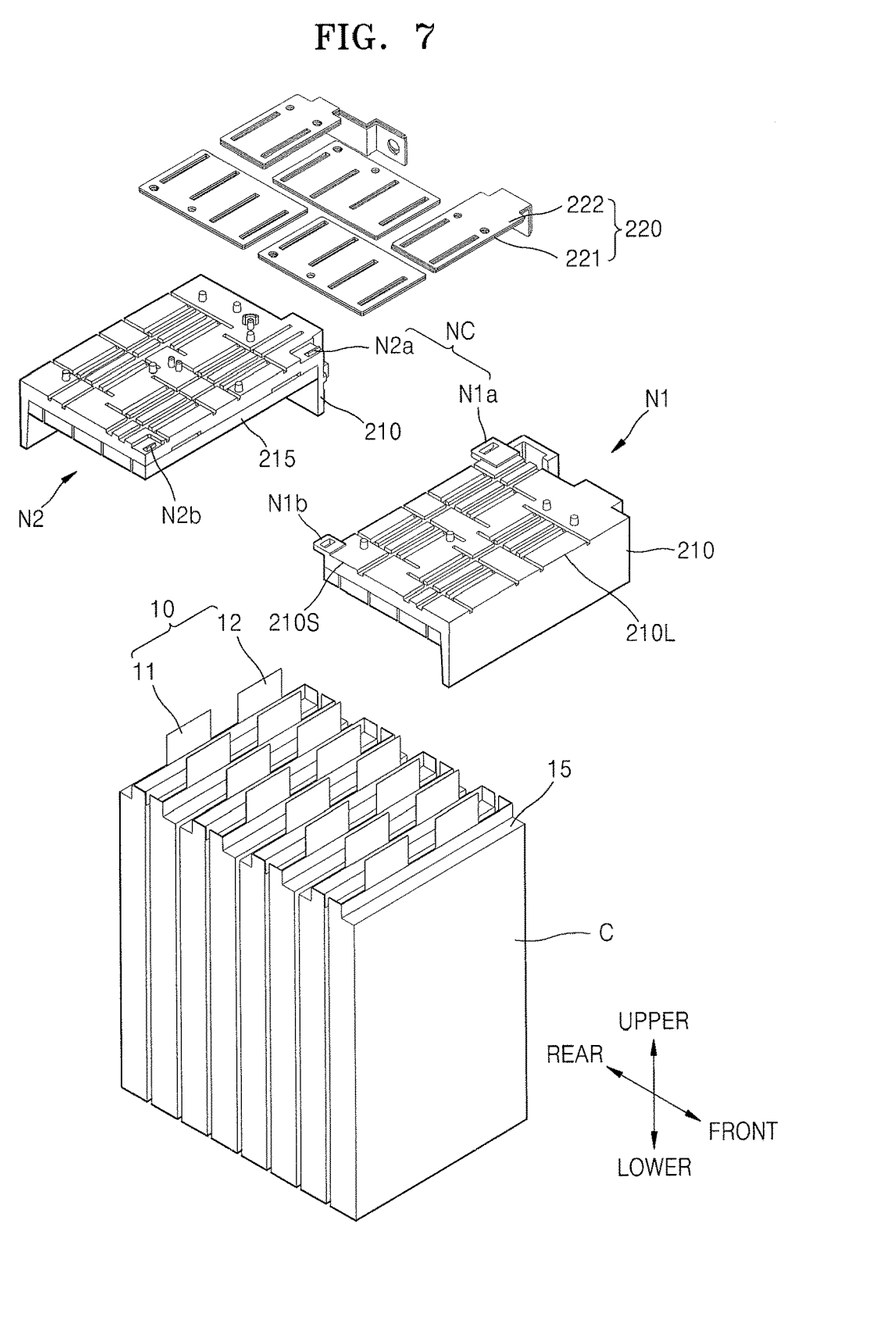
FIG. 7 illustrates an exploded perspective view of the battery pack depicted in FIG. 6.

FIG. 6 illustrates a view depicting a battery pack according to another exemplary embodiment. FIG. 7 illustrates an exploded perspective view depicting the battery pack depicted in FIG. 6.

Referring to FIG. 6, the battery pack may include a first unit pack N1 and a second unit pack N2 coupled to each other. As described below, the battery pack may be made up of only one of the first and second unit packs N1 and N2 or of the first and second unit packs N1 and N2 coupled together according to a desired output power or capacity level. As described below, the first and second unit packs N1 and N2 may have substantially the same structure.

In the exemplary embodiment, the first and second unit packs N1 and N2 having substantially the same structure may be connected together to double the output power or capacity of the battery pack. The first and second unit packs N1 and N2 have substantially the same structure. Accordingly, various performance requirements may be flexibly handled. For example, the battery pack may be constituted by a single unit pack such as the first unit pack N1 or the second unit pack N2 for applications requiring relatively low power levels or may be constituted by connecting the first and second unit packs N1 and N2 for applications requiring relatively high power levels. The battery pack may be constituted according to power requirements by one or more unit packs having substantially the same structure. Accordingly, the efficiency of processes for manufacturing the battery pack may be increased. Investment on designs and production equipment for producing battery packs having different structures and output power levels may be avoided.

In the exemplary embodiment, the first and second unit packs N1 and N2 may have substantially the same structure. The expression "substantially the same structure" indicates that the first and second unit packs N1 and N2 do not necessarily have completely the same structure, the first and second unit packs N1 and N2 have almost identical structures. For example, the designs of the first and second unit packs N1 and N2 may be identical except for some parts such as expansion connection parts NC (described below).

Referring to FIG. 7, cell holders 210 may include expansion connection parts NC. The expansion connection parts NC may be used to connect the first and second unit packs N1 and N2. For example, the expansion connection parts NC may be formed on edge portions or outer portions of the cell holders 210. The expansion connection parts NC of the first and second unit packs N1 and N2 may be coupleable to each other. For example, the cell holder 210 of the first unit pack N1 may include first and second expansion connection parts N1a and N1b to couple with the cell holder 210 of the second unit pack N2, and the cell holder 210 of the second unit pack N2 may include first and second expansion connection parts N2a and N2b to couple with the cell holder 210 of the first unit pack N1. In FIG. 7, the cell holders 210 of the first and second unit packs N1 and N2 are denoted with the same reference numeral. The cell holder 210 of the first unit pack N1 may be coupleable to the cell holder 210 of the second unit pack N2 through the expansion connection parts NC.

For example, the expansion connection parts NC may include the first and second expansion connection parts N1a, N1b, N2a, and N2b. The first and second expansion connection parts N1a, N1b, N2a, and N2b may be formed along long sides 210L of the cell holders 210 at separate positions in a left-to-right direction. The cell holder 210 of each of the first and second unit packs N1 and N2 may have an approximately rectangular shape including a pair of parallel long sides 210L and a pair of parallel short sides 210S. The first and second expansion connection parts N1a, N1b, N2a, and N2b may be formed at paired positions along mutually-facing long sides 210L of the cell holders 210. When the first and second expansion connection parts N1a, N1b, N2a, and N2b are paired along the relatively long sides 210L of the cell holders 210, the coupling between the first and second unit packs N1 and N2 may be enhanced owing to the first and second expansion connection parts N1a, N1b, N2a, and N2b.

In the exemplary embodiment, the first and second expansion connection parts N1a, N1b, N2a, and N2b may be respectively formed on the first and second unit packs N1 and N2. For example, the first unit pack N1 may include a pair of first and second hole-shaped expansion connection parts N1a and N1b, and the second unit pack N2 may include a pair of first and second expansion protrusion-shaped connection parts N2a and N2b.

In the exemplary embodiment, the first and second unit packs N1 and N2 may include the first and second expansion connection parts N1a, N1b, N2a, and N2b having different shapes as described above. The first and second unit packs N1 and N2 may have different shapes. In other implementations, the first unit pack N1 may include a pair of first and second expansion connection parts N1a and N1b having protrusion and hole shapes, and the second unit pack N2 may include a pair of first and second expansion connection parts N2a and N2b having hole and protrusion shapes. For example, in a state in which the first and second unit packs N1 and N2 have substantially the same shape except for having laterally inverted structures, the first and second expansion connection parts N1a, N1b, N2a, and N2b of the first and second unit packs N1 and N2 may be coupled together.

The expansion connection parts NC may include holes or protrusions. For example, the first and second expansion connection parts N1a and N1b of the first unit pack N1 may include holes, and the first and second expansion connection parts N2a and N2b of the second unit pack N2 may include protrusions.

In this case, the expansion connection parts NC of one or more of the first and second unit packs N1 and N2, for example, the first and second expansion connection parts N1a and N1b of the first unit pack N1, may protrude outwardly from the cell holder 210 and may coupleable to the first and second expansion connection parts N2a and N2b of the second unit pack N2. For example, the first and second unit packs N1 and N2 may be coupled to each other by coupling the first and second expansion connection parts N1a and N1b of the first unit pack N1 to the first and second expansion connection parts N2a and N2b of the second unit pack N2.

The battery pack may be formed according to a required high degree of output power by coupling relatively small unit packs such as the first and second unit packs N1 and N2. Accordingly, the battery pack may be easily manufactured compared to the case in which battery packs are directly manufactured without using relatively small unit packs. For example, when many battery cells C are combined by inserting insert electrode tabs 10 into tab holes to satisfy a required high degree of output power, it may be difficult to align and couple the battery cells C as the number of battery cells C increases. If the number of battery cells included in each unit pack such as the first and second unit packs N1 and N2 is limited in consideration of alignment with cell holders 210 and assembling processes, alignment and assembling errors may be reduced, and thus high-quality battery packs may be provided through flexible process management instead of tight process management.

Referring to FIG. 7, the cell holders 210 may include support ribs 215 protruding downward from the cell holders 210 for supporting terraces 15 of battery cells C. The support ribs 215 may be brought into direct contact with the terraces 15 of the battery cells C. Each of the end support ribs 215 formed at both ends of the cell holders 210 in a front-to-rear direction may support the terrace 15 of one battery cell C, and each of inner support ribs 215 may support the terraces 15 of a pair of neighboring battery cells C. The end support ribs 215 formed at both ends of the cell holders 210 in a battery cell arrangement direction may be relatively narrow, and the inner support ribs 215 may be relatively wide.

Connection tabs 220 for electrically connecting the battery cells C may include first and second connection tabs 221 and 222. The first and second connection tabs 221 and 222 may be disposed on lower and upper sides of electrode tabs 10 of the battery cells C such that the electrode tabs 10 may be sandwiched between the first and second connection tabs 221 and 222.

As described above, according to the one or more of the above exemplary embodiments, the battery cells of the battery pack are prevented from being damaged by collision between neighboring battery cells or collision with the cell holder structurally combining the battery cells.

Support ribs may be formed in one piece with a cell holder to maintain a distance between the cell holder and the battery cells. Accordingly, additional parts such as foam tape and additional processes may be omitted. In addition, since the support ribs are uniformly formed, the battery pack may be used or operated more reliably.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
   a plurality of battery cells, each battery cell of the plurality of battery cells including an electrode assembly and a battery cell case that seals the electrode assembly, and an electrode tab electrically connected to the electrode assembly and extending in an extending direction outwardly from the battery cell case that seals the electrode assembly, the battery cell case that seals the electrode assembly including a terrace from which the electrode tab extends, the terrace having a flat surface perpendicular to the extending direction of the electrode tab and a standing surface parallel to the extending direction of the electrode tab, the plurality of battery cells providing a plurality of the battery cell case, the terrace, the electrode tab, the flat surface and the standing surface, each corresponding to a battery cell of the plurality of battery cells;
   a cell holder through which the electrode tab of each battery cell is inserted; and
   a plurality of support ribs protruding from the cell holder toward the battery cells, each support rib including a side surface facing the standing surface of the terrace of one of the battery cells, the side surface extending parallel to the protrusion direction of the supporting rib, and a flat surface that extends in a direction parallel to the terrace and directly contacts the flat surface of the terrace such that the support rib supports the terrace.

2. The battery pack as claimed in claim 1, wherein:
   the cell holder extends across the battery cells.

3. The battery pack as claimed in claim 2, wherein the cell holder extends across the terraces of the battery cells in a state in which the support ribs are between the cell holder and the terraces.

4. The battery pack as claimed in claim 2, wherein the support ribs are in an arrangement direction of the battery cells.

5. The battery pack as claimed in claim 4, wherein:
   terraces of neighboring battery cells are coplanar with each other, and
   at least one of the plurality of support ribs contacts and supports terraces of neighboring battery cells.

6. The battery pack as claimed in claim 4, wherein:
   the plurality of support ribs in the arrangement direction of the battery cells includes inner support ribs and end support ribs, the inner support ribs of the plurality of support ribs in the arrangement direction of the battery cells have a relatively wide width such that each of the inner support ribs supports terraces of neighboring battery cells, and the end support ribs of the plurality of support ribs at both ends in the arrangement direction of the battery cells have a relative narrow width such that each of the end support ribs supports a terrace of one battery cell.

7. The battery pack as claimed in claim 1, wherein the support ribs are formed in one piece with the cell holder.

8. The battery pack as claimed in claim 1, wherein the cell holder includes expansion connection parts that are connectable with another cell holder such that a number of battery cells included in the battery pack is increasable.

9. The battery pack as claimed in claim 8, wherein the expansion connection parts include a pair of expansion connection parts at lateral positions of a long side of the cell holder.

10. The battery pack as claimed in claim 8, wherein the expansion connection parts protrude from the cell holder.

11. The battery pack as claimed in claim 8, wherein the expansion connection parts include at least one selected from protrusions and holes.

12. The battery pack as claimed in claim 1, further comprising a connection tab above the cell holder, the connection tab being connected to the electrode tab.

13. The battery pack as claimed in claim 1, wherein each battery cell of the plurality of battery cells is a pouch type battery cell, the battery cell case that seals the electrode assembly being a flexible case.

* * * * *